(12) United States Patent
Johnson (10) Patent No.: US 8,539,710 B2
(45) Date of Patent: Sep. 24, 2013

(54) RETRACTABLE HOOK SET

(76) Inventor: Bruce Mark Johnson, Crandon, WI (US)

( * ) Notice: Subject to any disclaimer, the term of this patent is extended or adjusted under 35 U.S.C. 154(b) by 0 days.

(21) Appl. No.: 13/346,124

(22) Filed: Jan. 9, 2012

(65) Prior Publication Data

US 2012/0174465 A1    Jul. 12, 2012

Related U.S. Application Data

(60) Provisional application No. 61/431,421, filed on Jan. 10, 2011.

(51) Int. Cl.
*A01K 97/12* (2006.01)

(52) U.S. Cl.
USPC .............................................. 43/15

(58) Field of Classification Search
USPC ....................... 43/15–17; 119/796
See application file for complete search history.

(56) References Cited

U.S. PATENT DOCUMENTS

| 384,853 | A | * | 6/1888 | Kellee | 43/15 |
| 2,204,560 | A | * | 6/1940 | Douglas | 43/15 |
| 2,899,768 | A | * | 8/1959 | Steinaur | 43/15 |
| 3,457,665 | A | * | 7/1969 | Duvall et al. | 43/15 |
| 3,867,779 | A | * | 2/1975 | McMaster | 43/15 |
| 3,874,106 | A | * | 4/1975 | Edwards | 43/15 |

* cited by examiner

*Primary Examiner* — Kimberly Berona
(74) *Attorney, Agent, or Firm* — Derek L. Prestin (57) ABSTRACT

The Retractable Hook Set consist of a trigger attached to a string or ribbon that retracts back into the hook set shell or pole holder for tangle free storage. The string or ribbon is adjustable by the use of a spring loaded spool and button which allows it to adapt to most pole lengths. This also allows the tension of the pole to be set, which changes the power at which the hook is set. The hook sets molded shell is designed to have a clamp attached. The clamp allows the hook to be attached to the pole or most pole holders. The trigger holds and releases the tension of the pole which hooks the fish. The hook set is adaptable to all fishing.

10 Claims, 7 Drawing Sheets

RETRACTABLE HOOK SET

CROSS REFERENCE OF RELATED APPLICATION

This application is based upon and claims the benefit of the U.S. Provisional Application Ser. No. 61/431,421. Filed Jan. 10, 2011.

BACKGROUND OF THE INVENTION

The Retractable Hook Set is a device which uses a fishing pole or jig pole's own power to set the hook when a fish bites and pulls on the line. When the line is pulled, it sets off the trigger which releases the tension on the pole. As the tension is released, it pulls the line with a rapid jerk that sets the hook in the fish.

BRIEF SUMMARY OF THE INVENTION

The Retractable Hook Set consists of a trigger which may or may not be stored within the outer shell or pole holder depending on the design. A string or ribbon that may or may not be calibrated, a spool that is capable of holding a string or ribbon, and a flat recoil spring that is encased within the spool and molded shell or pole holder. When encased within a molded shell, it will have a clamp attached. It also has a push button that is spring loaded which holds the tension of the bent pole and the resistance of the spool spring.

The trigger is attached to the ribbon or string. The spool has a flat spring wrapped in the center. The spool is inserted in the shell or pole holder and wound with tension. The ribbon or string is threaded through the button and attached to the spool. The button is then locked into the shell or rod holder. The cover of the shell or holder is then assembled. The ribbon or string wraps around the outer edge of the spool when the button is pushed as the tension of the spring is released. At this time the trigger may be locked into the trigger cavity of the shell or pole holder. The shell then has a clamp attached with a couple of links or a swivel.

DETAILED DESCRIPTION OF THE INVENTION

A Retractable Hook Set 10 is a device which uses a fishing pole 40 or jig pole's own power to set a hook when a fish bites and pulls on a fishing line 42 attached to the fishing pole 40 or jig pole. When the fishing line 42 is pulled, it sets off a trigger 12 which releases the tension on the pole 40. As the tension is released, it pulls the fishing line 42 with a rapid jerk that sets the hook in the fish.

The Retractable Hook Set 10 consists of an outer shell 14 or pole holder 30 and a trigger 12, which may or may not be stored within a trigger cavity 26 within the outer shell 14 or pole holder 30 depending on the design. The Retractable Hook Set 10 further consists of a string or ribbon 16, which may optionally include calibrations or similar length indicators, a spool 18 that is capable of holding the string or ribbon 16, and a flat recoil spring 20 attached to the spool 18 that is encased within the spool 18 and molded shell 14 or pole holder 30. When the Retractable Hook Set 10 is encased within a molded shell 14, the molded shell 14 will preferably include a clamp 22 for attaching the molded shell 14 to a fishing pole holder 30 or other similar structure. The molded shell 14 also includes a push button 24 that is spring loaded which holds the tension of the bent pole 40 and the resistance of the spool spring 20. That is, when the push button 24 is pressed, it releases its grip on the string or ribbon 16 and allows the string or ribbon 16 to be retracted onto the spool 18 within the molded shell 14 or to be extended to allow the attachment of the trigger 12 to a fishing pole 40 and fishing line 42.

The trigger 12 is attached to the string or ribbon 16. The spool 18 has a flat spring 20 wrapped in the center that causes the spool 18 to be biased so as to rotate the spool 18 and retract the string or ribbon 16 toward the molded shell 14. The spool 18 is inserted in the shell 14 or pole holder 30 and wound with tension. The ribbon or string 16 is then threaded through the button 24 and attached to the spool 18. The button 24 is then locked into the shell 14 or pole holder 30. The cover of the shell 14 or holder 30 are then assembled together. The string or ribbon 16 wraps around the outer edge of the spool 18 when the button 24 is pushed as the tension of the spring 20 is released. When the string or ribbon 16 has been fully retracted, the trigger 12 may be locked into the trigger cavity 26 of the shell 14 or pole holder 30 to allow for the easy storage of the Retractable Hook Set 10. The shell 14 then has a clamp 22 attached with a couple of links or a swivel 28.

Figure 6:
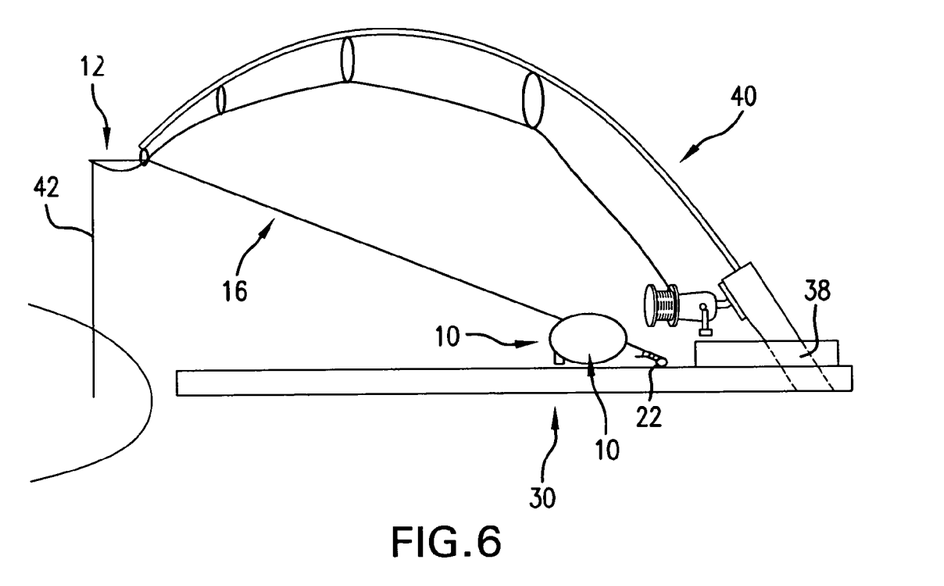
FIG. 6 Shows a retractable hook set of the present invention clamped to a rod holder.
Figure 7:
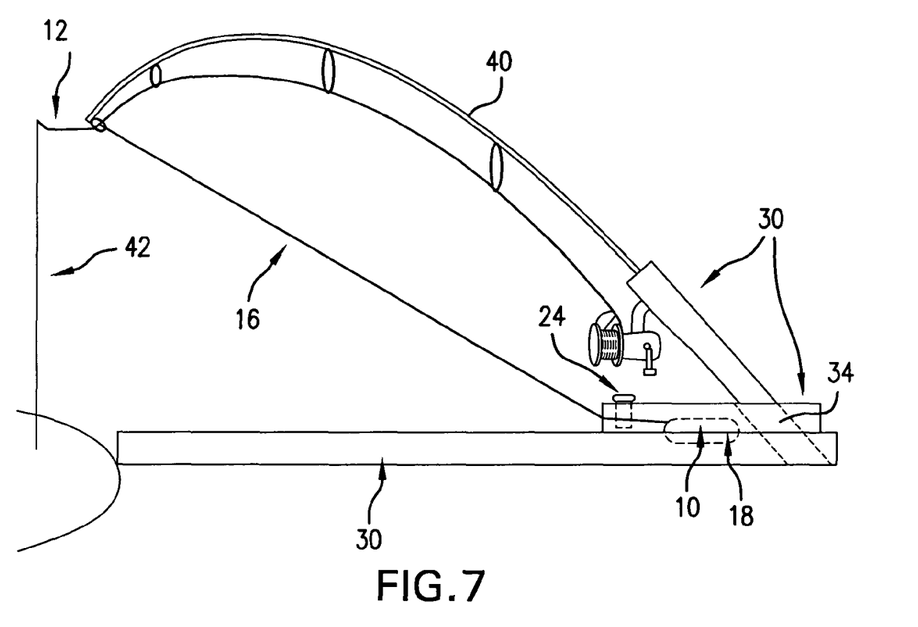
FIGS. 7 & 8 Shows a retractable hook set of the present invention installed within a pole holder.
Figure 8:
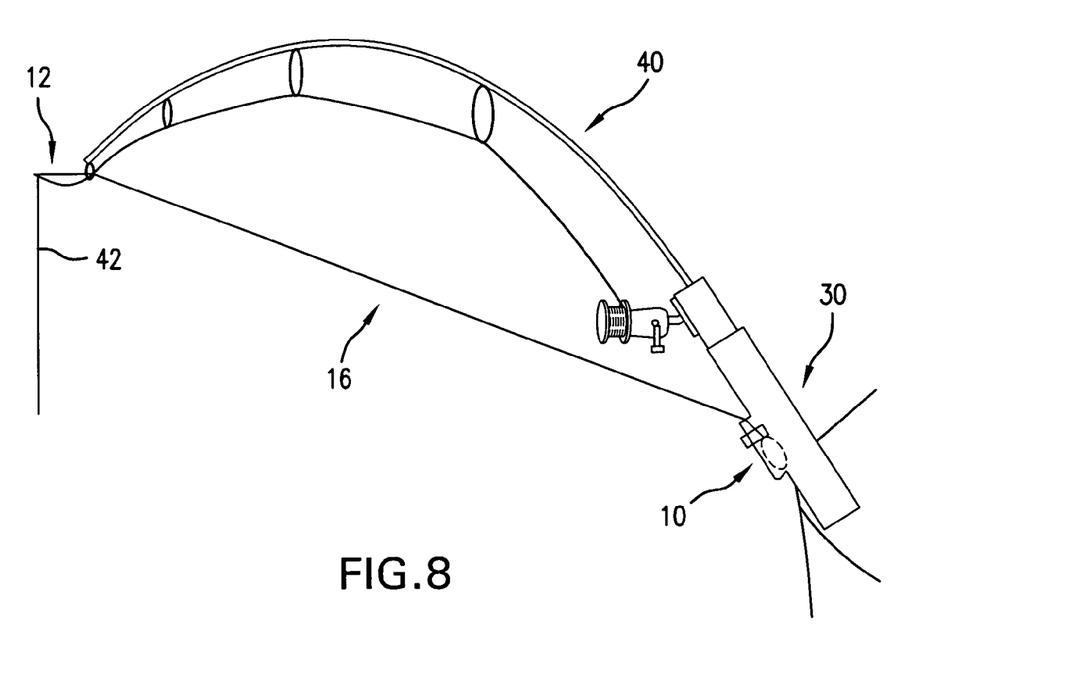

The Retractable Hook Set 10 can be used with almost any fishing pole 40 or fishing pole holder 30. It may be designed to be clamped onto the pole 40 or pole holder 30 as shown in FIG. 6, or it can be installed within a pole holder 30 as in shown in FIGS. 7 and 8.

Figure 1:
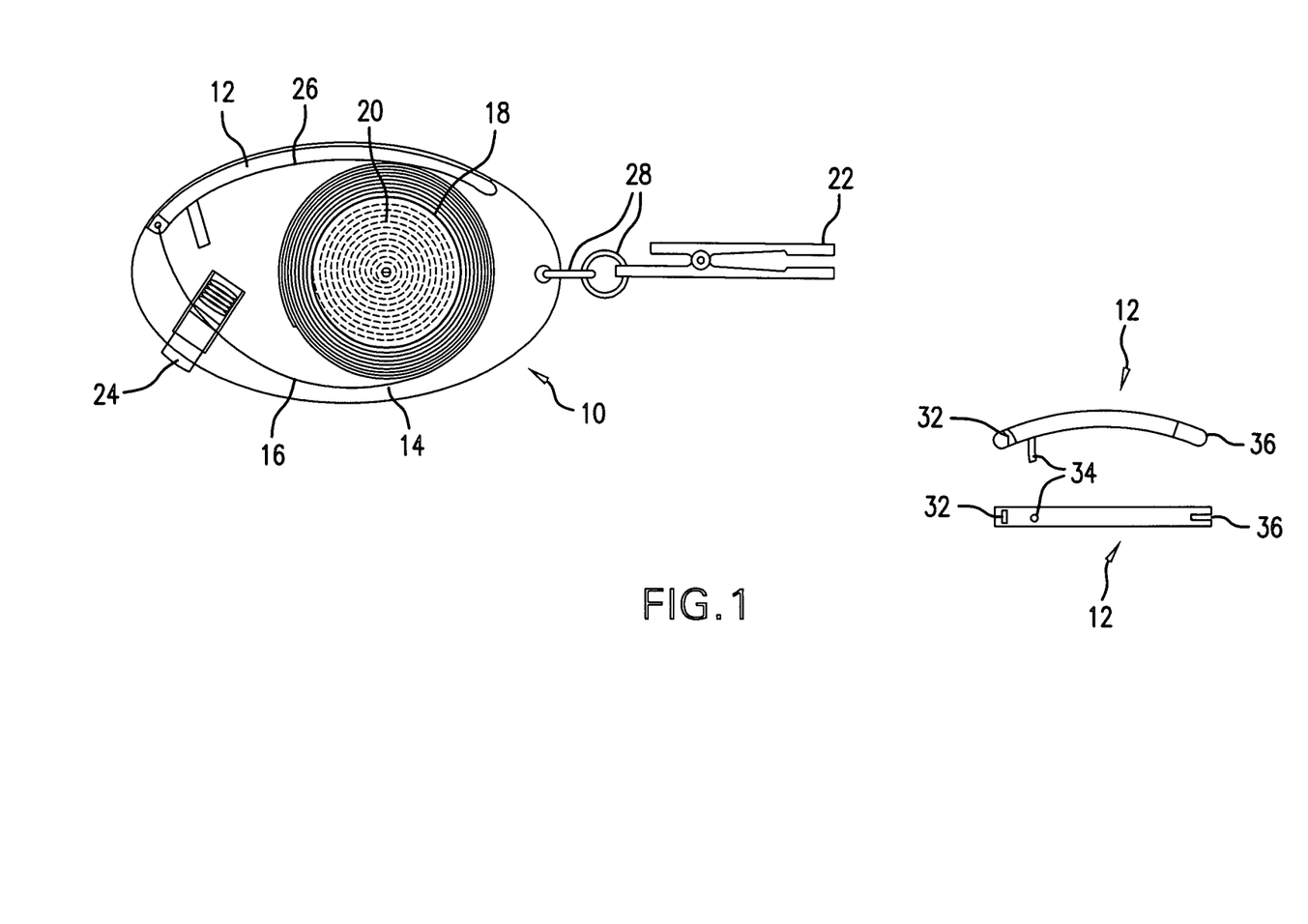
FIG. 1 Is the cross-sectional view of a retractable hook set of the present invention.
Figure 2A:
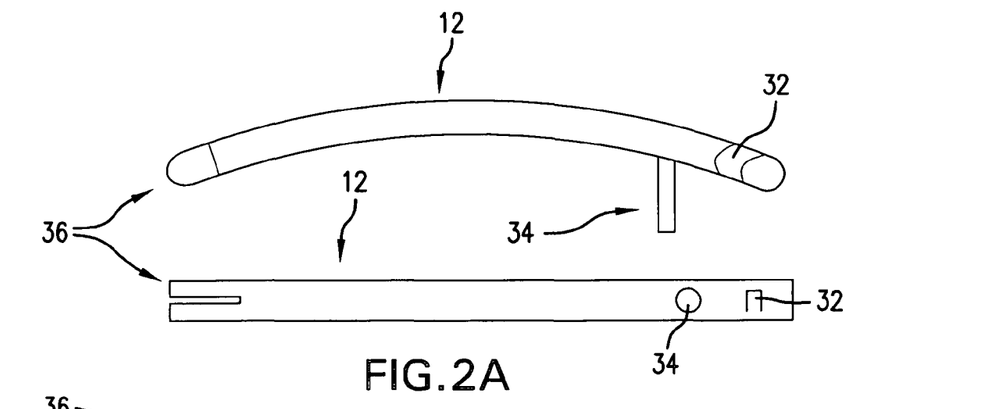
FIG. 2 Is a close up of a molded trigger of the present invention. A curved and a flat trigger so it may be adapted to fit the shell or pole holders shape for locking into place.
Figure 2B:
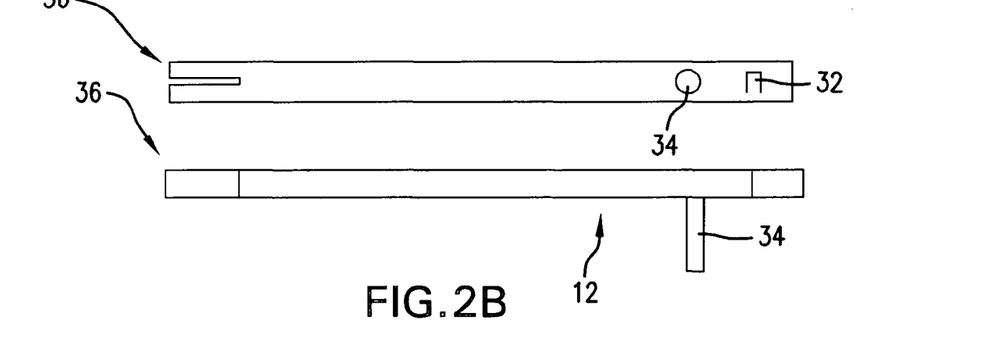
Figure 3A:
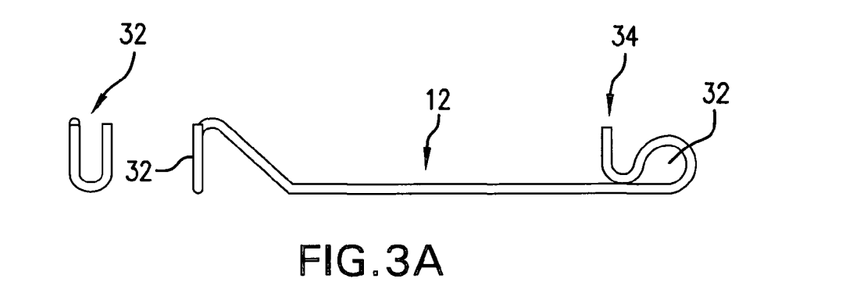
FIG. 3 Shows the design of triggers made of wire.
Figure 3B:
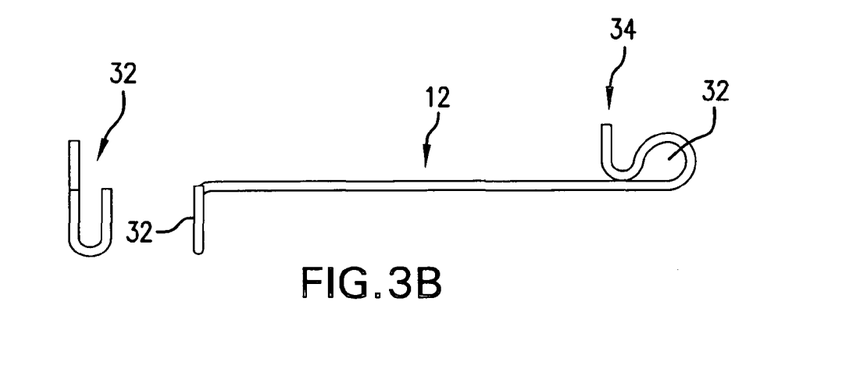
Figure 4:
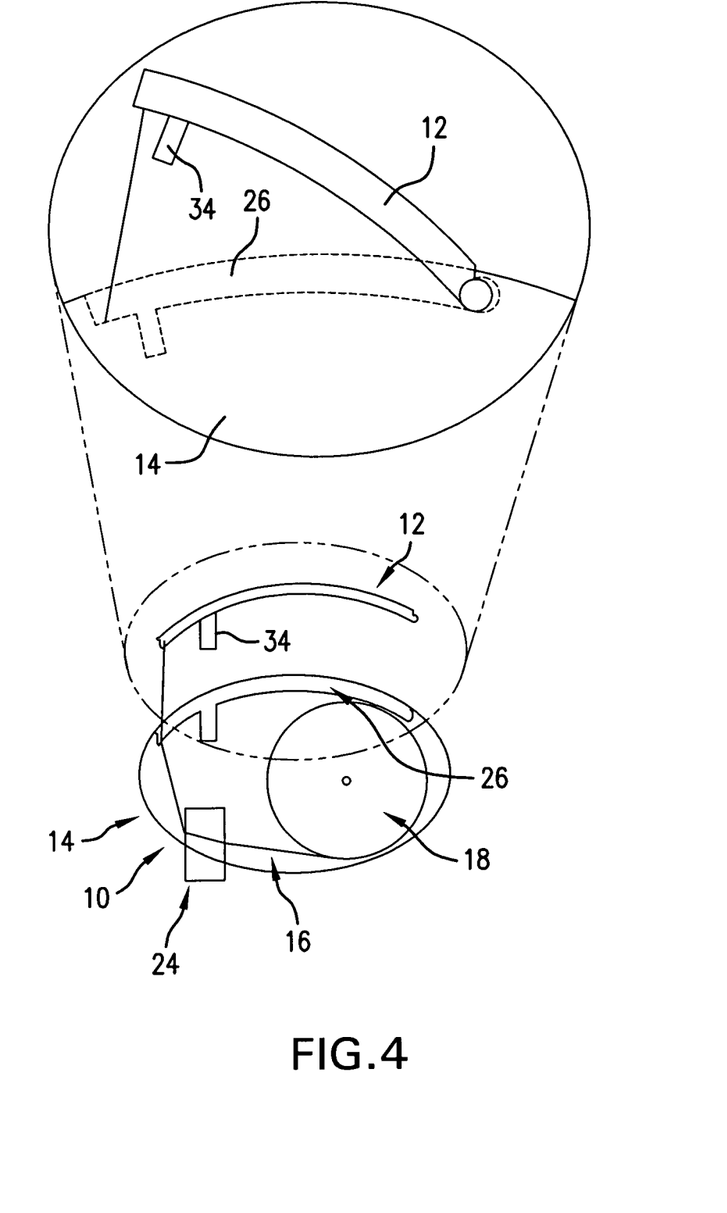
FIG. 4 Shows a cross-sectional view of the design of the trigger locking into a retractable hook set shell.
Figure 5:
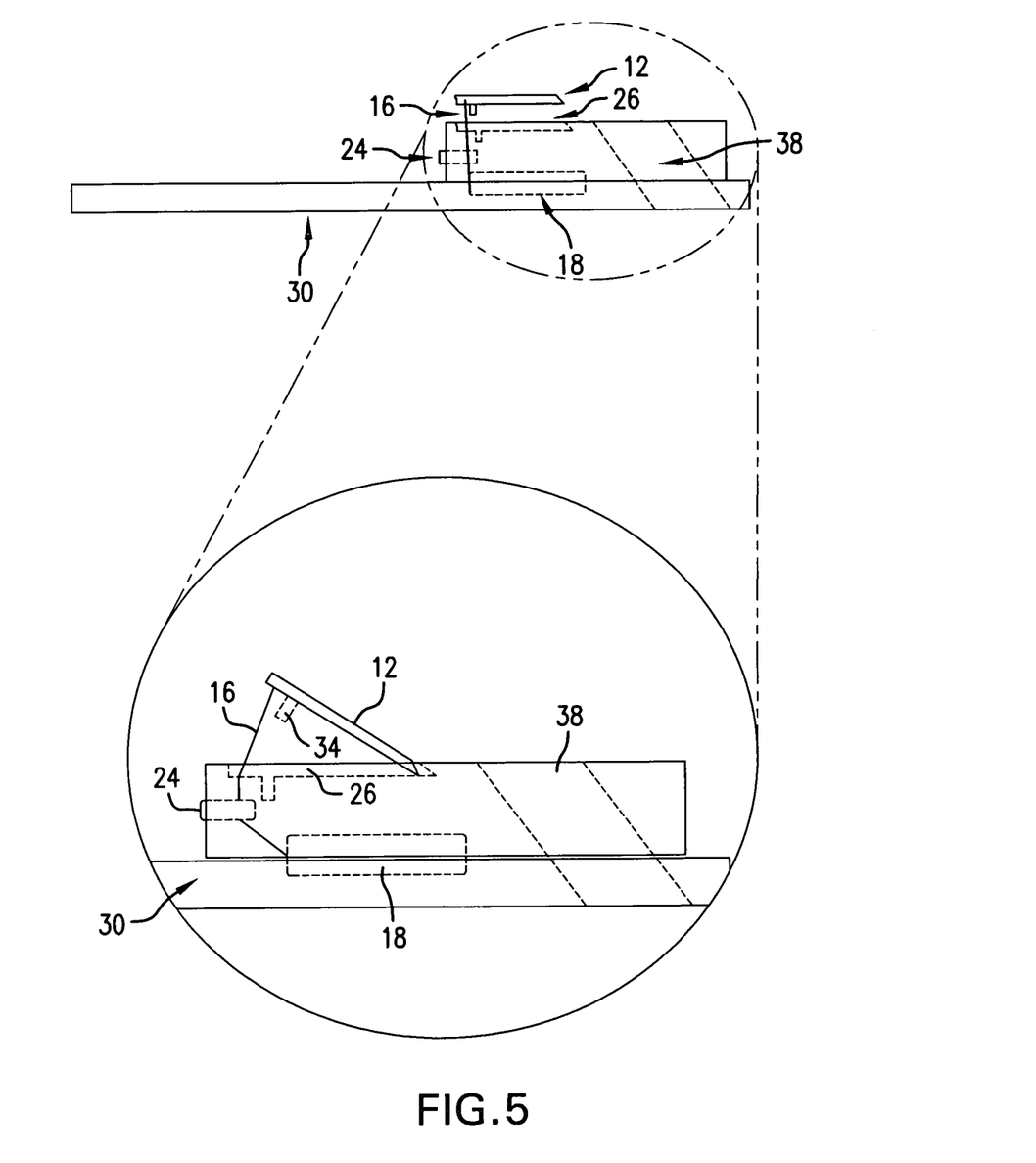
FIG. 5 Shows a cross-sectional view of the present invention. The design of the trigger locking into a rod holder.

The trigger 12 includes a slot 32 for receiving the string or ribbon 16, a pin 34, and a slot 36 for receiving a fishing line 42. The trigger 12 shown in FIG. 2 illustrates a straight design and a curved design for the trigger 12 that can be mold or carved from any rugged material. FIG. 4 shows how the curved trigger design can be molded or carved to the contour of the molded shell 14 so it may be locked into the trigger cavity 26 of the molded shell 14 for storage. The tip of the trigger 12 is shaped such that it locks into the trigger cavity 26 and the tension on the string or ribbon 16 holds the trigger 12 in place within the trigger cavity 26. FIG. 3 shows the a design for the trigger 12 made using wire so the length and style of the trigger 12 can be changed. FIG. 4 shows a curved design that locks into a trigger cavity 26 in the molded shell 14 and creates a compact unit that is self-contained for tangle-free storage. FIG. 5 shows a design wherein the molded shell 14 also holds a fishing pole 40 in a pole holder 30 to create a pole holder 30, and the recoil spool 20 is assembled within the pole holder 30 and also has a trigger 12 that is designed so as to locks within the trigger cavity 26 in the pole holder 30. The tip of the trigger 12 includes a beveled angle that holds the trigger 12 within the trigger cavity 26 while tension on the string or ribbon 16 and the button 24 hold the trigger 12 within the trigger cavity 26. The trigger sensitivity can be increased or decreased by two different methods. The first method is by changing the length of the trigger 12 between the slot 32 and the pin 34. By increasing the length, it will increase the sensitivity. By decreasing the length, it will decrease the sensitivity. The second method is by bending the pin 34 of the trigger 12 towards the slot 32 or away from the slot 32 of the trigger 12. To increase the sensitivity, bend the pin 34 of the trigger 12 towards the slot 32. To decrease the sensitivity, bend the pin 34 of the trigger 12 away from the slot 32. The deeper the slot 32, the more secure the fishing line 42 will be held by the trigger 12. The size of the trigger 12, pin length, and pin diameter is based upon the size of the fishing pole 40 within which the Retractable Hook Set 10 will be used. For example, the trigger size will be different for a Retractable Hook Set 10 to be used with a large heavy fishing poles verses a Retractable Hook Set 10 to be used with a jig pole.

The advantage of using the retractable string or calibrated ribbon 16 is that almost any length of fishing pole 40 can be used with the Retractable Hook Set 10 of the present invention. The longer the pole 40, the longer the string or ribbon 16 needed. If a longer pole 40 is being used, the user may just pull out more string or ribbon 16. If a shorter pole 40 is being used, the user may push the button 24 to retract the string or ribbon 16 to the desired length.

The hook set 10 is also designed to adjust the strength of the hook setting power. The hook setting power is adjusted or changed by the length of the string or ribbon 16; the shorter the string or ribbon 16, the harder the hook setting power. The hook setting power is produced by the fishing pole's tension from being bent. The shorter the string or ribbon 16, the more the pole 40 will be bend when the trigger 12 is set and the greater the hook setting power will be.

Optionally, the retractable string or ribbon 16 may be calibrated. The calibration serves two purposes. First, the calibrations allow the user to set up the Retractable Hook Set 10 in the same manner for the same pole consistently. The trigger set-up and length of string work together. The calibrations on the string or ribbon 16 allow the set to be consistent by pulling the same length of string or ribbon 16 out each time. Second, the calibrations on the string or ribbon 16 also can be used for measurement purposes (for example, to measure a fish caught by the user), making a separate measuring tape unnecessary.

To use the retractable hook set, all the user needs is a fishing pole 40 or jig pole, a pole holder 30, and the Retractable Hook Set 10. First, the user must find the depth to fish and use a line marker to keep the desired depth. The user then inserts the pole 40 into the pole holder 30 and clips the clamp 22 of the Retractable Hook Set 10 onto the pole holder 30 or pole 40. When the Retractable Hook Set 10 is installed within the pole holder 30, there is no clamp and the user may just insert the pole 40 into the pole hole 38 of the pole holder 30. After installing the pole 40, the user holds the trigger 12 and pulls out the string or ribbon 16 to the desired length. The user then bends the pole 40 and inserts the pin 34 of the trigger 12 into the tip eyelet of the pole 40. The tension of the pole 40 will hold the trigger 12 in place; if not, the user may have to adjust the pin sensitivity or shorten the string length. The user then takes the fishing line 42 by the tip of the pole 40 and places it into the slot 32 of the trigger 12. The fishing line 42 will then go from the slot 32 of the trigger 12 into the water. When the fishing line 42 is pulled when a fish bites, it sets off the trigger 12 which releases the tension on the pole 40. As the tension is released, it pulls the fishing line 42 with a rapid jerk that sets the hook in the fish.

It will be recognized by one skilled in the art that the size, configuration, or dimensions of the Retractable Hook Set 10 may be adjusted to accommodate different fishing poles and fishing pole holders from different manufacturers. While the invention has been described in the specification and illustrated in the drawings with reference to certain preferred embodiments, it will be understood by those skilled in the art that various changes may be made and equivalents may be substituted for elements thereof without departing from the scope of the present invention as defined in the appended claims. In addition, many modifications may be made to adapt a particular situation or material to the teachings of the invention, as defined in the appended claims, without departing from the essential scope thereof. Therefore, it is intended that the present invention not be limited to the particular embodiments illustrated by the drawings and described in the specification as the best modes presently contemplated for carrying out the present invention, but that the present invention will include any embodiments falling within the description of the appended claims.

The invention claimed is:

1. A retractable hook set for fishing comprising:
   a body portion;
   a retractable member, wherein the retractable member is attached at a first end to a rotatable spool and the spool includes a recoil spring, such that the spool is biased to rotate the spool and retract the retractable member into the body portion, and wherein the spool is encased within the body portion;
   a spring loaded push button locking member, said retractable member being threaded through the spring loaded push button locking member such that the locking member may be shifted from a locked configuration wherein the retractable member is held in place by the locking member and an unlocked configuration wherein the retractable member is movable, and wherein the locking member is attached to the body portion;
   a trigger member, wherein the trigger member is attached to the retractable member at a second end opposite said first end, said trigger member including a first slot, a second slot and a pin, wherein the pin extends perpendicularly from the trigger member;
   wherein said second end of said retractable member extends through and is secured to the trigger at the first slot;
   and wherein when the body portion is secured to a fishing pole, a user may hold the trigger and pull a desired length of the retractable member from the body portion so as to provide a desired tension on the length of the fishing pole such that when the pin of the trigger is inserted into the tip eyelet of the fishing pole, a fishing line may be inserted into said second slot of the trigger member so that when the fishing line is pulled when a fish bites, it sets off the trigger which releases the tension on the pole thereby allowing a rapid jerk for the setting of a hook on the fishing line in the fish.

2. The retractable hook set for fishing of claim 1, wherein the body includes a trigger cavity and the trigger is secured within the trigger cavity when the retractable member is in a fully retracted configuration.

3. The retractable hook set for fishing of claim 1, wherein the body portion includes a pole holder for holding a fishing rod.

4. The retractable hook set for fishing of claim 1, wherein the retractable member is a string.

5. The retractable hook set for fishing of claim 1, wherein the retractable member is a ribbon.

6. The retractable hook set for fishing of claim 1, wherein the retractable member is a wire.

7. The retractable hook set for fishing of claim 1, wherein the retractable member includes calibration markings for indicating the length of the retractable member.

8. The retractable hook set for fishing of claim 1, wherein the body portion includes a clamp.

9. The retractable hook set for fishing of claim 1, wherein the body portion includes a hook.

10. The retractable hook set for fishing of claim 1, wherein the body portion includes a fishing rod.

\* \* \* \* \*